Figure 1:
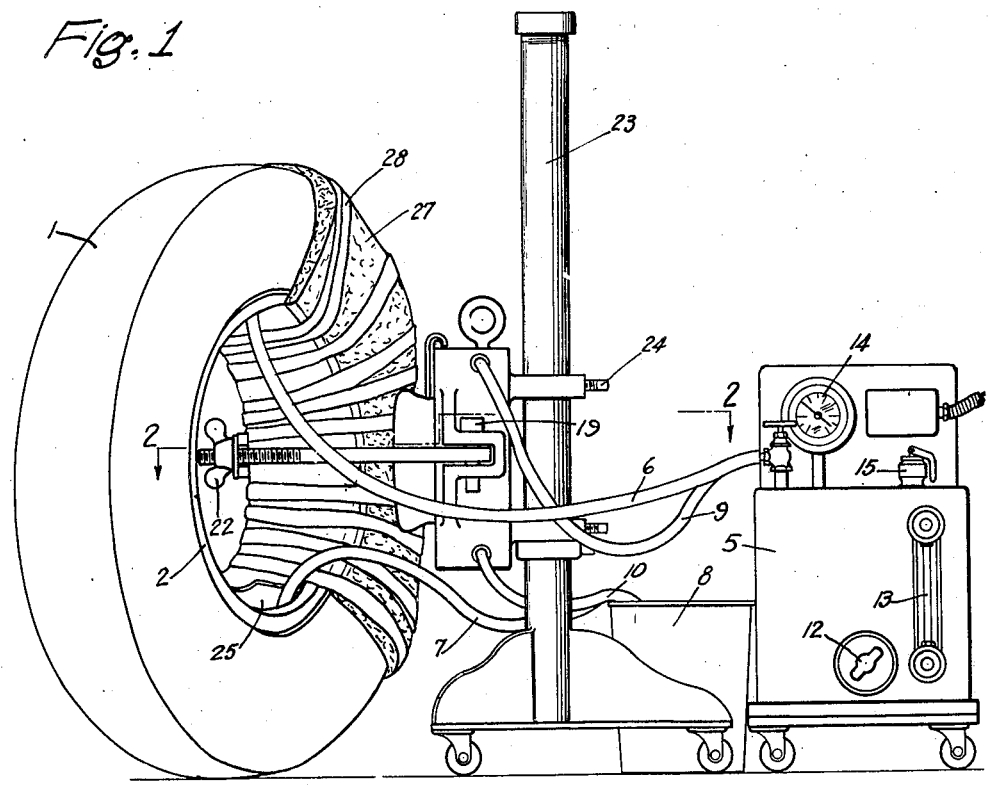

Feb. 27, 1945. J. C. HEINTZ 2,370,241
COMBINATION SPOT VULCANIZER
Filed June 4, 1942  2 Sheets-Sheet 1

Inventor
James C. Heintz
Gordon C. Mack
Attorney

Feb. 27, 1945.  J. C. HEINTZ  2,370,241
COMBINATION SPOT VULCANIZER
Filed June 4, 1942    2 Sheets-Sheet 2
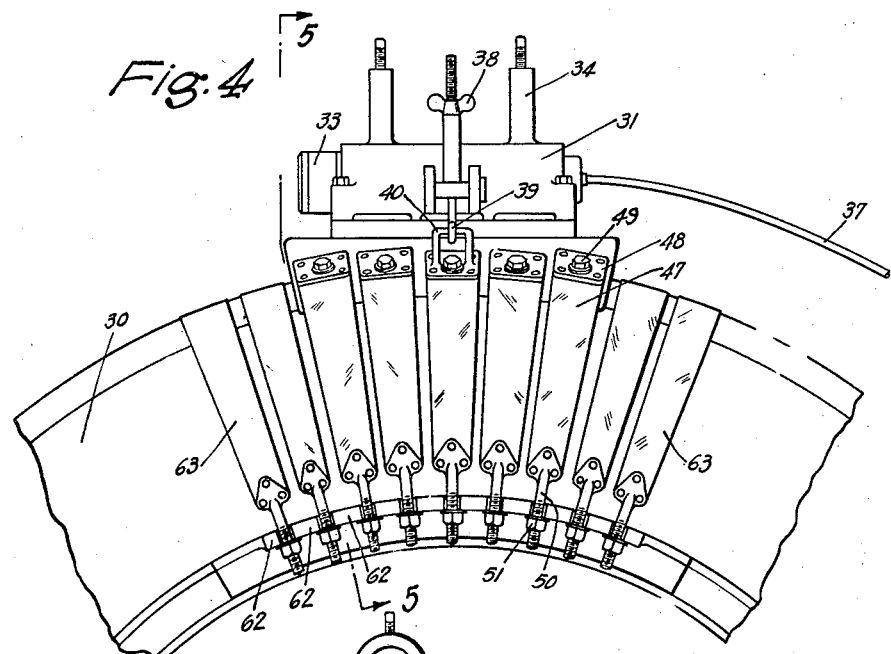
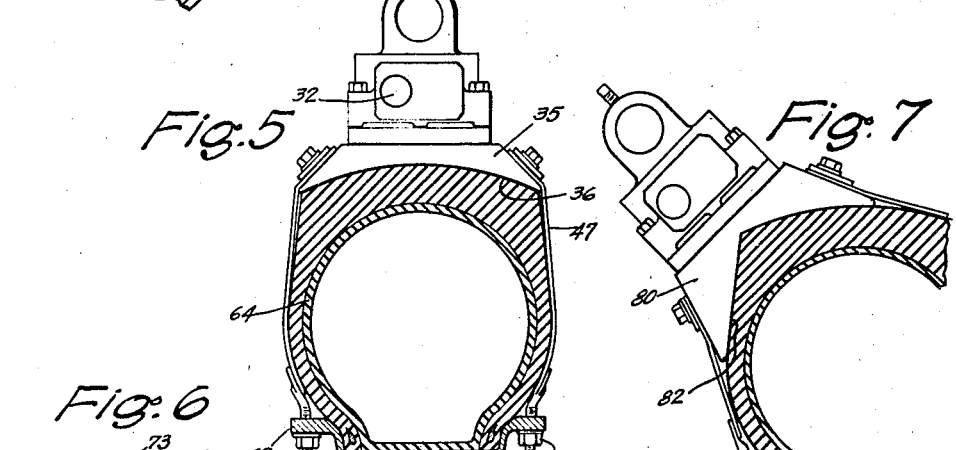
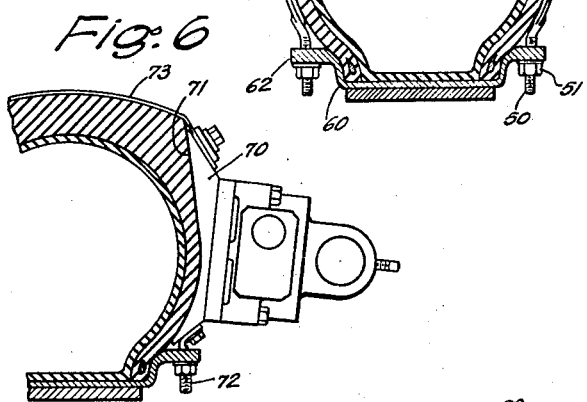
Inventor
James C. Heintz Patented Feb. 27, 1945

2,370,241

UNITED STATES PATENT OFFICE 2,370,241

COMBINATION SPOT VULCANIZER

James C. Heintz, Lakewood, Ohio

Application June 4, 1942, Serial No. 445,704

5 Claims. (Cl. 18—18)

This invention relates to a combination spot vulcanizer for repairing pneumatic tires which heats a repair from within the tire at the same time that heat is applied locally to the outside of the tire. More particularly, the invention relates to such spot vulcanization of a pneumatic tire while mounted on a rim.

A usual way of mending a pneumatic tire which has been damaged by a blowout or other break, is to cut away the old rubber on each side of the fabric and to cut away the damaged fabric. The hole made by cutting away the old rubber is usually tapered from both the outside and the inside surface of the tire down to the fabric. The entire surface of the hole is then cemented and the tire is built up with fabric and rubber stock, the amount of fabric used being dependent upon the number of plies in the original tire. The new rubber stock is then covered with :c: nd or lining cement and the tire is ready for  anization. In spot vulcanization as previously arried out a steam bag, usually a sectional bag, is placed inside of the tire and an appropriate spot vulcanizing mold surface or contour plate is fitted to the outside of the tire covering the patch. This plate on the outside of the tire is generally made of aluminum and is heated by a steam chest or electrical heating coil which is fastened to it. The section of the tire which contains the steam bag is then covered on the outside with heat insulating pads, which are generally held to the tire by being wrapped with cloths.

In the use of the new apparatus for combination spot vulcanization the tire is patched with vulcanizable rubber stock and fabric in the usual way, and after insertion of the steam bag, is mounted on a rim. The patch is covered with a contour plate or the like and the tire near the patch is then wrapped with cotton tape or the like during the vulcanization of the patch. Steel tapes may be used for this purpose as described below. It might even be possible to use an inexpensive wooden mold for this purpose.

The equipment required for thus repairing a tire is relatively simple and not expensive. Contour plates of different design are required for vulcanizing different portions of the tire. For example, a different plate will be required for a patch on the tread of a tire from the plate required for patching a sidewall. Different sizes of steam bags will be required for large and small tires. The same heating unit may be used to heat plates of different sizes and shapes. And except for the rims, this is substantially all the equipment necessary.

Figure 2:
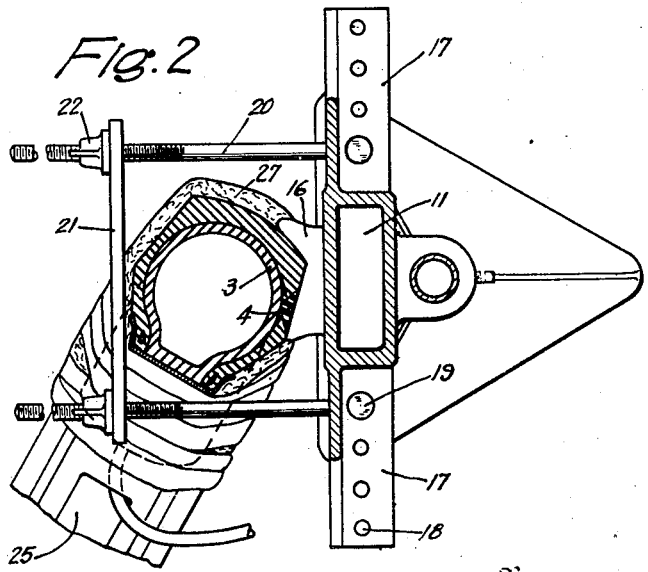
Figure 3:
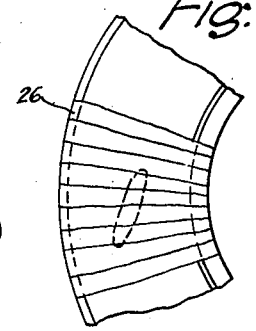

The invention will be further described in connection with the accompanying drawings in which Figs. 1-2 show one type of equipment designed particularly for repairing tractor and implement tires, and which may be used on other tires which are not as thick as the usual bus balloon and heavy duty truck tires which require more heat than can be supplied with this type of equipment. Figs. 4-7 illustrate a modified type of equipment. Fig. 1 is an elevation; Fig. 2 is a section on the line 2—2 of Fig. 1; Fig. 3 is a detail showing the wrapping required over a bad break in the sidewall of a tire; Fig. 4 is a side view showing equipment for a tread repair which eliminates the necessity of using any outer wrap; Fig. 5 is a section on the line 5—5 of Fig. 4; and Figs. 6 and 7 are sectional views showing equipment of similar design for use on the sidewall and shoulder of a tire, respectively.

Figs. 1-3 show the tire 1 mounted on the rim 2. Fig. 2 shows the sectional steam bag 3 in section and also in dotted outline. This steam bag may extend a quarter of the way around the tire, more or less. The new rubber which forms the patch is indicated by the numeral 4.

The electrically heated boiler 5 supplies steam to the steam bag through the hose 6. Exhaust steam from the steam bag is returned through the hose 7 through an exhaust valve to means 8 for collecting the condensate. Steam for heating the mold is supplied through the hose 9 to the steam chest 11 which is shown in section in Fig. 2, and the hose 10 serves as a return line. The boiler is equipped with a switch 12, a sight glass 13, a pressure gauge 14, and a safety valve 15.

The steam chest 11 is designed large enough to supply the heat required for any size of mold. The mold contour plate 16 is detachable and may be fastened to the face of the steam chest 11 in any one of several positions. The wings 17 on each side of the steam chest are provided with holes 18 for the pegs 19. These pegs hold the bolts 20 spaced at any distance from the chest. The clamping bar 21 which holds the tire to the mold 16 is slipped over the bolts 20 and held in place by the wing nuts 22. These wing nuts should be tightened only sufficiently to cause the vulcanizer to press against the tire.

The chest 11 is slidable on the vertical post 23 and may be fastened at any distance from the floor by tightening the bolts 24.

To repair a tire the old rubber and fabric are cut away from the damaged portion of the tire and the tire is patched with rubber stock and fabric in the usual way. If only the fabric is damaged there is no reason for cutting away any of the old rubber on the outer surface of the tire and there is then no real reason for using any mold contour plate. It is then only necessary to insert the steam bag and mount the tire on a rim and turn on the steam in the steam bag. This is an exceptional type of repair.

The usual procedure is to patch the tire with vulcanizable rubber stock on both surfaces of the tire and with fabric in the manner now usually employed. The sectional steam bag is then inserted in the tire with the patch coming at about the mid-point of the steam bag. The tire is then mounted on the rim. The rim is conveniently provided with two hand holes 25 through which the steam hoses 6 and 7 pass. In practice only short lengths of hose are attached to each end of the steam bag. The hose leading from the boiler and to the discharge is connected with these short lengths through quickly detachable means.

If the break is large the tire and rim are wrapped with a wrap 26 similar to that now usually employed (see Fig. 3). A single layer of wrap is all that is required and it need not extend much beyond the break.

A contour plate 16 which fits the particular injury is now selected and is attached to the face of the steam chest 11 in a position best adapted to fit the contour plate to the injury.

The surface of the tire around the plate 16 and over the whole length of the steam bag is then covered with an insulating pad 27 of the usual type. This is held in place by the tape 28. Other means of holding the insulating pad in place may be used.

The steam is now turned on. The steam in the steam bag heats the inner surface of the patch and the plate 16, heated by the steam chamber, heats the outer surface of the patch. The insulating pad 27 prevents any great loss of heat through radiation. About 60 pounds of steam pressure is ordinarily used in the steam bag. This quickly raises the new rubber stock to vulcanization temperature and the application of heat is continued as long as necessary to effect vulcanization.

The equipment shown in Figs. 4-7 is designed particularly for the combination spot vulcanization of very large heavy duty tires, for example an 18.00 x 24 tire up to a 24.00 x 32, although it can be used with larger and smaller tires. With the larger tires a full-circle steam bag is generally used, and with smaller tires, for example, a 9.00 x 24, a sectional bag gives satisfactory results.

Figs. 4 and 5 show the spot vulcanizer fastened on the tread of the tire 30, ready for use. The vulcanizer may be steam-heated as previously illustrated, or as here shown it may comprise the compartment 31 in which electrically heated coils are located. The dial 32 on the instrument case 33 indicates the temperature to which the coils are heated. A rheostat may be provided for regulating the temperature of the coils as desired. It will be noted that the vulcanizer shown is provided with rings 34 so that it may be located on the upright 23 of a standard such as that shown in Fig. 1 if desired. The contour plate 35 is composed of alumina or other suitable metal for conducting the heat to the spot to be vulcanized. The under surface 36 of the plate 35 is smooth and shaped to accommodate the general contour of a tire tread. Current is supplied through the conductor 37.

The operator needs but one heating unit for a whole set of mold plates. By loosening the wing nuts 38 on each side of the heating unit the hooks 39 are lowered so that they may easily be turned under the bars 40 of the loops provided on each side of each of the mold plates. The heating unit may then be lifted from the mold plate and by reversing the process may be fastened to any other mold plate on which it is to be used.

The spot vulcanizer is held in place by metal straps 47 which are fastened at one end to the mold plate 35 by means of the plates 48 and bolts 49. The opposite end of each strap is provided with a bolt shank 50 on which the nut 51 screws to tighten these straps. The rim 60 on which the tire is mounted is provided with the narrowly spaced lugs 62 over an arc of the order of about 20 or 30°, and the shanks 50 fit between these lugs. As the nuts 51 are tightened they bear against the lower surfaces of the lugs and draw the mold plate to the tire and hold it firmly in place.

In addition to the straps which are fastened to the mold plate it is advisable to provide two or three straps at each end of the vulcanizer such as the straps 63 which are adjustably fastened at each end to the rim, to limit the expansion of the tire at this point.

It will be noted that the adjustability of the nuts 51 adapts the vulcanizer to fit tires of different sizes. The heating surface 36 may be somewhat wider than the tread as shown in Fig. 5 or the shoulders of the tread may extend somewhat beyond this heating surface.

The rim on which the tire is mounted for combination spot vulcanization is preferably a sectional rim such as that described in my U. S. Patent No. 2,124,111. The lugs 62 may be formed on to the rim as here shown, or a separate plate with suitable anchoring means may be provided beneath the rim on which the tire is mounted.

In using this type of apparatus the tire is patched in any suitable way such as that above described. The steam bag 64 is inserted in the tire and the tire is mounted on the rim 60. The steam bag is adjusted so that the drain for the condensate is located at or near the bottom of the tire. The mold plate is then strapped in place by the straps 47 and then the straps 63 are strapped in place. The heating unit 31 is fastened to the mold plate. The current is then turned on and steam is turned into the steam bag. The order of applying heat to the interior and exterior of the tire and the period during which heat is supplied to the contour plate and steam bag may be varied depending upon the nature and size of the tire injury, etc. After the vulcanization of the patch is completed the straps are easily removed by loosening the nuts 51 and the tire is then removed from the rim.

If the patch is on the sidewall of the tire a contour plate such as the plate 70 shown in Fig. 6 with an under surface 71 shaped to accommodate the usual sidewall surface is used. The bottom of the plate 70 is provided with bolt shanks 72 without any intervening straps. The straps 73 which are fastened to the top of the contour plate pass over the tread of the tire and down the opposite side and are fastened between lugs on the opposite side of the rim.

If the repair is to be made at or near the shoulder of the tire a contour plate 80 such as that shown in Fig. 7 is used which has an under surface 82 shaped to accommodate the usual angle at the shoulder of a tire.

For the sake of simplicity the tires illustrated in the drawings are shown with smooth treads. In practice they will be provided with lugs. In the very large tires these lugs may be several inches thick. An insulation pad such as the pad 27 of Figs. 1 and 2 may be used with the equipment illustrated in Figs. 4-7, but because of the extreme size of the lugs used on very large tires it will probably be preferable to fill in the space around the lugs with a heat-conducting plastic, such as a plaster-of-Paris composition.

After curing, any newly formed tread may be engraved to resemble the old tread.

It is evident that various modifications and improvements may be made in the apparatus here shown.

I claim:

1. Apparatus for the combination spot vulcanization of a patch of vulcanizable rubber stock in a tire which comprises a rim adapted for mounting the tire thereon, on each side of the rim extending throughout an arc of the order of about 20 to 30° anchoring means comprising a plurality of lugs which are so spaced as to provide means for inserting a bolt shank radially between adjacent lugs, a spot vulcanization contour plate, at each side of said plate and attached directly thereto straps, one end of each of which is attached to said plate, at the other end of each strap a bolt shank fitted between two of said lugs and a nut on each shank on the opposite side of the lugs from the plate, said straps being spaced close enough to one another to hold the tire in shape when inflated by a steam bag.

2. A pneumatic tire rim and on each side thereof throughout an arc of the order of about 20 to 30° anchoring means comprising a plurality of lugs so spaced as to provide for insertion of a bolt shank radially between all adjacent lugs.

3. Vulcanizing equipment for repairing an injured tire comprising a rim member of a size suitable for mounting thereon the section of a tire which contains the injury, an inflatable bag for use within the section of the tire which contains the injury, means for applying a fluid heating medium to said bag, means for applying heat to the outside of the tire locally at the repair, and flexible means substantially coextensive with said means for applying heat to the outside of the tire and cooperating with said rim member for holding said means for applying heat against the outside of the tire and for preventing undesirable expansion of the said injured section of the tire when the heating medium is introduced into the inflatable bag under pressure while the bag is in place between the rim member and the injured section of the tire.

4. Vulcanizing equipment for repairing a tire with a hole therein filled with vulcanizable rubber, which includes a rim adapted for mounting the tire thereon, an inflatable bag for insertion in the tire with means for inflating the same, means for applying heat to the outside of the tire locally at the hole, straps for holding said heat-applying means an adjustable distance from the rim, and means for anchoring the straps associated with the rim, said straps being closely spaced throughout the length of said heat-applying means and being arranged so as to prevent undesirable expansion of the tire when a heating medium is introduced into the inflatable bag under pressure.

5. Vulcanizing equipment for repairing a tire with a hole therein filled with vulcanizable rubber, which includes a rim adapted for mounting the tire thereon, an inflatable bag for insertion in the tire with means for inflating the same, means for applying heat to the outside of the tire locally at the hole, straps for holding said heat-applying means an adjustable distance from the rim, means for anchoring the straps associated with the rim, said straps being closely spaced throughout the length of said heat-applying means and being arranged so as to prevent undesirable expansion of the tire when a heating medium is introduced into the inflatable bag under pressure, and, in addition to the aforesaid straps, at least two other straps and means associated with the rim for anchoring one of the same adjacent each end of the aforesaid strap-anchoring means so that the tire may be embraced with one of the said two additional straps adjacent each end of said heat-applying means to prevent undesirable expansion of the tire at these places on inflation of the inflatable bag.

JAMES C. HEINTZ.

CERTIFICATE OF CORRECTION.

Patent No. 2,370,241.                                              February 27, 1945.

JAMES C. HEINTZ.

It is hereby certified that error appears in the printed specification of the above numbered patent requiring correction as follows: Page 2, first column, line 73, for "alumina" read --aluminum--; and that the said Letters Patent should be read with this correction therein that the same may conform to the record of the case in the Patent Office.

Signed and sealed this 22nd day of May, A. D. 1945.

Leslie Frazer (Seal)                        Acting Commissioner of Patents.